United States Patent [19]

Okano et al.

[11] 4,134,308

[45] Jan. 16, 1979

[54] DRIVEN MECHANISM FOR A ROTATORY HEAT REGENERATOR

[75] Inventors: Hiroshi Okano; Wataru Akai, both of Susono, Japan

[73] Assignee: Toyota Jidosha Kogyo Kabushiki Kaisha, Toyota, Japan

[21] Appl. No.: 805,178

[22] Filed: Jun. 9, 1977

[30] Foreign Application Priority Data

Mar. 7, 1977 [JP] Japan .................. 52-25179

[51] Int. Cl.$^2$ .................. F16H 57/00; F16H 55/04; F16H 55/12; F23L 15/02

[52] U.S. Cl. .................. 74/411; 74/434; 74/449; 165/8; 165/9

[58] Field of Search .................. 74/411, 434, 449; 165/8, 9

[56] References Cited

U.S. PATENT DOCUMENTS

| 3,401,741 | 9/1968 | Paluszy et al. | 165/8 |
| 3,430,687 | 3/1969 | Wardale | 165/8 |
| 3,667,220 | 6/1972 | Dekeyser | 165/9 |
| 3,741,287 | 6/1973 | Mittman | 165/8 |
| 3,828,844 | 8/1974 | Kitano et al. | 165/8 |
| 4,068,707 | 1/1978 | Dziedzic | 165/8 |

Primary Examiner—Leonard H. Gerin
Attorney, Agent, or Firm—Stevens, Davis, Miller & Mosher

[57] ABSTRACT

A driven mechanism for a rotatory heat regenerator, in which a shock absorbing member is fitted around the outer peripheral surface of a discoidal rotatory regenerator having a honeycomb structure. A metal ring having teeth is set around the outer periphery of the shock absorbing member and held in position thereby. The ring is driven by at least one driving gear connected with a prime mover and transfers torque to the rotatory regenerator. Torque fluctuations on the driving gear are moderated by the elastic deformation of the ring and the shock absorbing member. Any difference in the amount of thermal expansion between the ring and the regenerator is compensated by the shock absorbing member.

7 Claims, 9 Drawing Figures

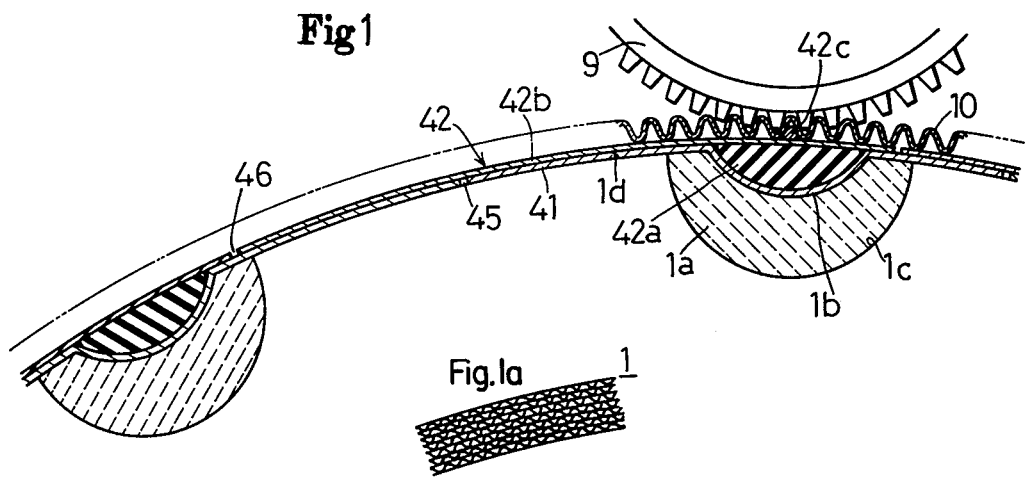
Fig 1
Fig. 1a
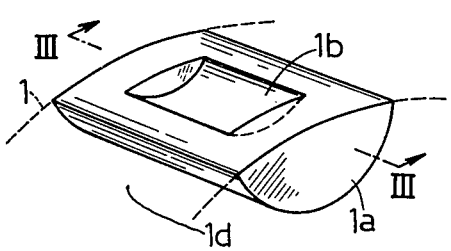
Fig 2
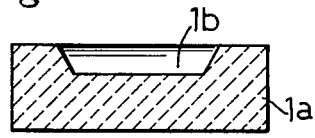
Fig 3
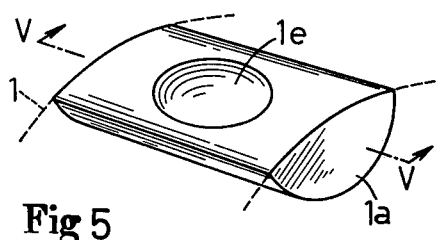
Fig 4
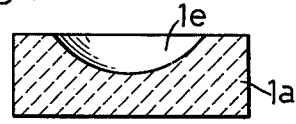
Fig 5
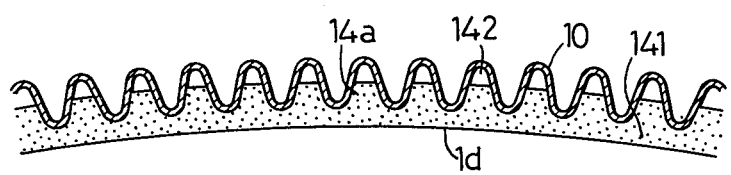
Fig 6
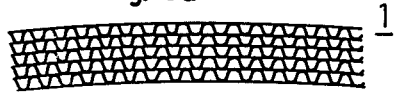
Fig. 6a

DRIVEN MECHANISM FOR A ROTATORY HEAT REGENERATOR

This invention relates to a driven mechanism for a rotatory heat regenerator used in a gas turbine and the likes. In a usual rotatory heat regenerating apparatus, a discoidal regenerator having a honeycomb structure with a great number of small perforations provided axially is housed rotatably in a casing. A ring having teeth prepared by machining is set around the outer periphery of the regenerator and a plurality of gears engaging with the teeth of the ring to support the regenerator roatatably is mounted to the casing. At least one of the gears is a driving gear driven by a motor and rotates the regenerator, while the other gears are provided only to support the regenerator rotatably.

Such a toothed ring has, among others, the following disadvantages:

(a) The ring is costly because of its machining preparation, though it does not require so precise a finish on the teeth.

(b) The ring must necessarily be rigid enough to endure machining for teeth formation and must, therefore, be considerably large in size and weight.

(c) The regenerator is usually made of a material having a small coefficient of thermal expansion, such as ceramics, while the toothed ring is usually made of a metal having a large coefficient of thermal expansion. Additional equipment, such as a mechanism using a spring, is required for compensating for the difference in the coefficient of thermal expansion between the ring and the regenerator, and adds to the overall cost of the apparatus and the necessity of its maintenance and repair.

It is an object of this invention to provide a ring having teeth for a rotatory heat regenerator which may be mass produced at a low cost and does not require any extra rigidity for its machining.

It is another object of this invention to provide a rotatory heat regenerator in which it is very easy to compensate any difference in thermal expansion between a ring having teeth and a regenerator.

It is a further object of this invention to provide a rotatory heat regenerator including a ring having teeth made of sheet metal and a shock absorbing mechanism which cooperate to effectively absorb any shock acting on the regenerator and lengthen life thereof.

In the accompanying drawings:

FIG. 1 is a front elevational view in section of a first embodiment of this invention;

FIG. 1a is a plan view of a portion thereof;

FIG. 2 is a perspective view of an example of the solid pin used in the apparatus of FIG. 1;

FIG. 3 is a sectional view taken on line III—III of FIG. 2;

FIG. 4 is a perspective view of another example of the solid pin;

FIG. 5 is a sectional view taken on line V—V of FIG. 4;

FIG. 6 is a front elevational view in section of a second embodiment of this invention;

FIG. 6a is a plan view of a portion thereof; and

Figure 7:
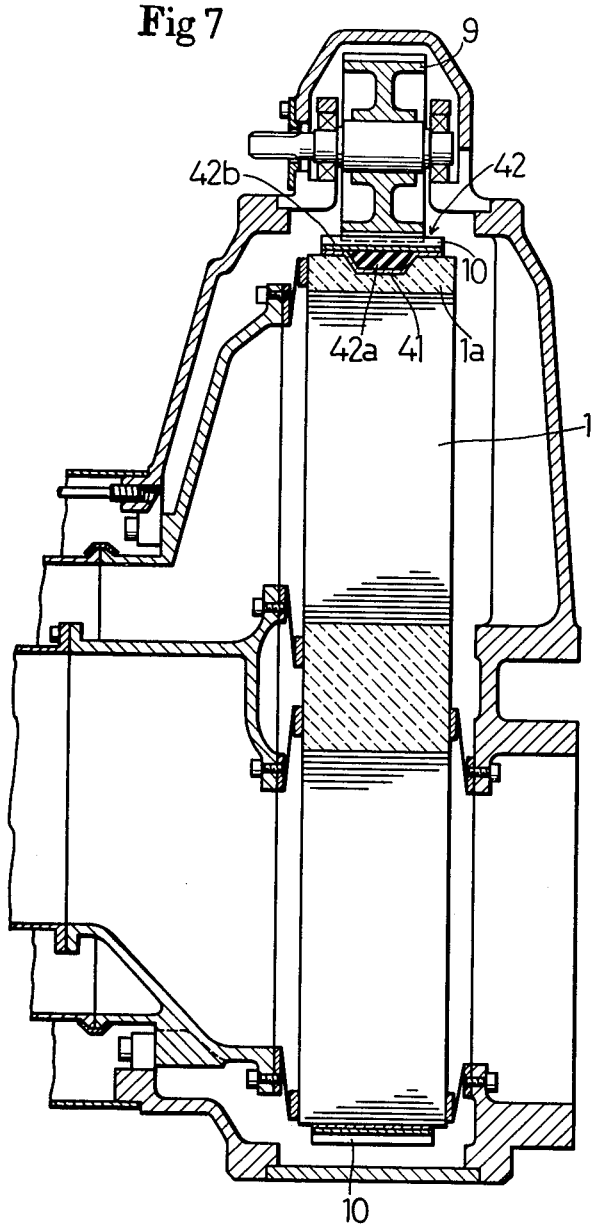
FIG. 7 is a side elevational view in section of the rotatory heat regenerator of this invention.

Referring to FIGS. 1 through 5 and 7, a first embodiment of this invention will be described. On the outer peripheral surface 1d of a regenerator 1 of the honeycomb structure having a great number of small perforations, a plurality of grooves 1c each having an arcuate cross section are provided axially of the regenerator 1. A solid pin 1a having a generally semicircular cross section is secured in each groove 1c by adhesion or otherwise. On the outer central portion of the solid pin 1a there is provided a key groove 1b having a trapezoidal cross section or a key groove 1e having a part-spherical cross-section as shown in FIGS. 2 through 5. An arcuately curved cushion plate 41 made of a material having an appropriate elasticity and partly having a reversely arcuate cross-sectional configuration is attached to the outer periphery 1d of the regenerator 1 over and in the vicinity of each key groove 1b or 1e with its reversely arcuate portion fitted in the key groove. A clearance 45 is provided between every two adjacent cushion plates 41. A similarly arcuate pressure plate 42 is placed on the outer surface of every two adjacent cushion plates 41. Each pressure plate 42 is composed of a key 42a engaged securely in the generally semi-circular recess formed by the arcuate portion of the cushion plate 41 in the key groove 1b of the regenerator 1, an arcuately curved, generally planar body 42b contacting the outer side of the cushion plates 41 and having an inner surface to which the key 42a is welded, a positioning bar 42c welded to the outer side of the outer surface of the body 42b in a position opposite to the key 42a. A clearance 46 is provided between every two adjacent pressure plates 42. A ring 10 made of corrugated elastic material to provide a multiplicity of teeth along its entire periphery engaging with a driving gear 9 encircles the pressure plates 42 in such a manner as to press down with an appropriate force all of the solid pins 1a, cushion plates 41 and pressure plates 42 against the regenerator 1. The positioning bar 42c is engaged with one of the teeth of the ring 10. The width of the ring 10 is not greater than the thickness of the regenerator 1 and is equal to the length of the positioning bar 42c. The ring 10 may be welded to the positioning bar 42c at both ends thereof.

In operation, the driving gear 9 is rotated by a prime mover not shown and the torque generated by the gear 9 is transmitted to the regenerator 1 through the positioning bar 42c, the body 42b, key 42a, the cushion plate 41 and the solid pin 1a to rotate the regenerator 1. The cushion plate 41 absorbs any impact caused by any nonuniform engagement between the driving gear 9 and the ring 10 and prevents the regenerator 1 from being destroyed. The cushion plate 41 is formed of a material having an appropriate elasticity, such as a heat resistant rubber sheet. The coefficient of thermal expansion of the cushion plate 41 is larger than that of the regenerator 1 and the clearance 45 provided between every two adjacent cushion plates 41 provide allowance for the greater thermal expansion of the cushion plates 41.

The inner diameter of the ring 10 is a little smaller than the outer diameter of a cylinder formed by the pressure plates 42, whereby the cushion plates 41 and the pressure plates 42 are clamped with an appropriate force against the regenerator 1. More specifically, the internal diameter of the ring 10 is such that it can tightly hold the pressure plates 42 even upon thermal expansion. The ring 10 can have its teeth satisfactorily formed on a press because the relatively low speed of rotation required for the regenerator 1 does not necessitate a very high dimensional accuracy of the teeth for their proper power transmission.

Another embodiment of this invention is shown in FIG. 6. In FIG. 6, a corrugated ring 10 is formed from an appropriate metal sheet as in the case of the embodiment of FIG. 1. A ring 141 made of heat insulative and elastic material is fitted around the outer periphery 1d of the regenerator 1 with an appropriate tightness and bonded or otherwise connected thereto. A plurality of teeth 141a engaging with the teeth of the ring 10, are provided on the outer periphery of the elastic ring 141. A clearance 142 is preferably left between each tooth 141a and the corresponding groove of the ring 10.

There are, for example, two methods of forming and fitting the elastic ring 141 around the outer periphery of the regenerator 1.

The first method is to form the elastic ring 141 from heat resisting rubber, such one called VITON, and expand it radially outwardly to fit it around the periphery of the regenerator 1. The ring 141 is maintained in position by frictional contact between the ring 141 and the regenerator 1. The ring 141 may, however, be bonded to the regenerator 1 to ensure firm connection. The ring 10 is placed about the elastic ring 141 after the ring 141 is fitted around the regenerator 1.

The second method is to suitably support the ring 10 around the peripheral surface 1d of the regenerator 1 in appropriately spaced relation thereto and fill the annular space between the inner peripheral surface of the ring 10 and the outer peripheral surface of the regenerator 1 with some appropriate silicone elastomer, such as SYLGARD 187 of Dow Corning Co. The elastomer is allowed to solidify to form a ring 141. This method is inappropriate in case it is desired to form the clearances 142 between the two rings.

In operation, the torque of the driving gear 9 is transmitted to the regenerator 1 through the rings 10 and 141. The second embodiment, in which there is no means similar to key grooves 1b or 1e, may be manufactured more easily and economically than the first embodiment. As the ring 141 is elastic, the torque transmission may satisfactorily be performed if only the shape of the teeth 141a is approximate to the shape of the teeth on the ring 10 and any concentrated load that may be generated locally during the torque transmission can be effectively scattered. Further, the ring 10, which is also elastic, can be advantageously dimensioned to resiliently clamp the ring 141 against the regenerator 1.

What is claimed is:

1. A driven mechanism for a rotatory heat regenerator comprising:
    an annular shock absorbing member placed around the outer periphery of a discoidal regenerator provided axially with a great number of small perforations;
    a metal ring having a corrugation engaging with a plurality of gears for driving and supporting said regenerator and fitted around the outer periphery of said shock absorbing member;
    means for engaging said corrugation of said ring with said shock absorbing member; and
    means for securing said shock absorbing member around said outer periphery of said regenerator.

2. A driven mechanism for a rotatory heat regenerator as set forth in claim 1, wherein said shock absorbing member comprises a ring of heat resisting and elastic material fitted around said outer periphery of said regenerator and formed on its outer periphery with teeth engaging with said corrugation of said ring.

3. A driven mechanism for a rotatory heat regenerator as set forth in claim 2, wherein said shock absorbing ring is adhesively bonded to said outer periphery of said regenerator.

4. A driven mechanism for a rotatory heat regenerator as set forth in claim 1, wherein said securing means comprises a plurality of grooves provided axially on said outer periphery of said regenerator and a plurality of solid pins of a generally semi-circular cross-section each fitted in one of said grooves and having a key groove on the outer surface thereof.

5. A driven mechanism for a rotatory heat regenerator as set forth in claim 4, wherein said shock absorbing member comprises a plurality of cushion plates extending longitudinally of said regenerator, each cushion plate having an arcuately curved portion contacting said outer periphery of said regenerator and a reversely curved portion fitted in said key groove, each cushion plate being formed from a material having a larger coefficient of thermal expansion than that of said regenerator, and a clearance being provided between every two adjacent cushion plates.

6. A driven mechanism for a rotatory heat regenerator as set forth in claim 5, wherein said corrugation engaging means comprises a plurality of pressure plates each comprising arcuately curved planer body contacting the outer surface of every two adjacent cushion plates, a key fastened to the inner surface fitted in said reversely curved portion of one of said two cushion plates, and at least one positioning bar fastened to the outer surface of said body in a position opposite to said key and engaging with one of the grooves formed by said corrugation of said ring.

7. A driven mechanism for a rotatory heat regenerator as set forth in claim 6, wherein said body is formed from a material having a larger coefficient of thermal expansion than that of said regenerator and a clearance is provided between said bodies of every two adjacent pressure plates.

* * * * *